(12) United States Patent
Valentine et al.

(10) Patent No.: US 6,356,755 B1
(45) Date of Patent: Mar. 12, 2002

(54) METHODS AND ARRANGEMENTS FOR CONTROLLING RE-REGISTRATION OF A MOBILE COMMUNICATIONS STATION BASED ON SATELLITE CALL OPTIMIZATION

(75) Inventors: Eric Valentine, Plano; Vladimir Alperovich, Dallas, both of TX (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/218,832

(22) Filed: Dec. 22, 1998

(51) Int. Cl.[7] .................................................. H04Q 7/22
(52) U.S. Cl. ...................................... 455/435; 455/434
(58) Field of Search ................................ 455/432, 433, 455/434, 435, 460, 38.3, 510, 552, 553, 564, 502; 370/342, 448, 503

(56) References Cited

U.S. PATENT DOCUMENTS

| | | | | |
|---|---|---|---|---|
| 4,977,612 A | * | 12/1990 | Wilson .................... | 455/166.1 |
| 5,438,608 A | * | 8/1995 | Kojima ....................... | 455/411 |
| 5,666,652 A | * | 9/1997 | Lin et al. .................... | 455/435 |
| 5,794,148 A | * | 8/1998 | Mamaghani et al. ....... | 455/435 |
| 5,887,259 A | * | 3/1999 | Zicker et al. ............... | 455/434 |
| 5,999,805 A | * | 12/1999 | Ruther et al. .............. | 455/410 |
| 6,018,666 A | * | 1/2000 | Chavez, Jr. ................. | 455/465 |
| 6,073,035 A | * | 6/2000 | Witter ......................... | 455/574 |
| 6,108,542 A | * | 8/2000 | Swanchara et al. ......... | 455/434 |
| 6,138,018 A | * | 10/2000 | Pashtan ...................... | 455/435 |
| 6,141,535 A | * | 10/2000 | Ayerst ........................ | 455/435 |
| 6,256,301 B1 | * | 7/2001 | Tiedemann, Jr. et al. ... | 370/342 |

* cited by examiner

Primary Examiner—Nay Maung
Assistant Examiner—Jean A Gelin
(74) Attorney, Agent, or Firm—Jenkens & Gilchrist P.C.

(57) ABSTRACT

Improved methods and arrangements are provided for use in mobile communications networks that require re-registration of mobile stations to optimal gateways to support improved call optimization. For example, mobile stations may be required to re-register with gateways that provide more efficient use of terrestrial trunk circuits. When a mobile station is requested to re-register with a more optimal gateway, there is an associated burden on the mobile communications network and supporting signaling system networks. Because of this, there is an inherent potential for intentional or unintentional abuse by one or more subscribers who repeatedly, continually, or simultaneously initiate signaling and/or processing required to optimize the call and re-register the mobile station(s). The present invention prevents such activity by identifying potential abuses, and providing controlling mechanisms within the mobile communications network that monitor and control re-registration and subsequent access requests to the network's resources.

24 Claims, 4 Drawing Sheets

METHODS AND ARRANGEMENTS FOR CONTROLLING RE-REGISTRATION OF A MOBILE COMMUNICATIONS STATION BASED ON SATELLITE CALL OPTIMIZATION

BACKGROUND OF THE INVENTION

TECHNICAL FIELD OF THE INVENTION

The present invention relates generally to communication systems, and more specifically to improved methods and arrangements for reducing unnecessary signaling and processing that can occur within mobile communications networks that employ call optimization techniques.

DESCRIPTION OF RELATED ART

There has long been a need to provide reliable and cost-efficient communications around the world. This need has traditionally has been addressed by installing terrestrial communication networks and providing satellite connectivity within and/or between the various terrestrial communication networks when necessary. In such a communication system there is usually at least one optimal route available for completing a communication or call. An optimal routing of the call, from the subscriber's unit to an end destination, may require the allocation of several different terrestrial and/or satellite network resources. It is typically preferred that such calls be established and maintained through those resources that are best positioned/configured to provide the desired level of service at an optimal cost to the service provider. As such, calling optimization techniques are often employed to efficiently utilize the network resources.

With recent increased demand for mobile communications, such as cellular radio-based telecommunications, the need to provide call optimization has increased dramatically. This is especially true for mobile telecommunication networks that include hundreds or thousands of network resources, including ground stations and satellites.

With this in mind, FIG. 1 is a block diagram depicting a portion of a conventional communications system 10 that is configured to optimize a call from a mobile station through either satellite resources and/or available terrestrial resources.

Communications system 10 as depicted in FIG. 1 and described herein is not intended to provide a exhaustive description of such a communications system. Providing such a description is beyond the scope of the present invention. Instead, communications system 10 is provided to focus on specific problems associated with such a system and certain types of optimization techniques that are used therein to allocate resources. For a more complete description of such an exemplary communications system and related optimization techniques see co-pending U.S. patent application Ser. No. 08/996,480 filed Dec. 23, 1997, which is hereby incorporated by reference.

Referring again to FIG. 1, communications system 10 includes a satellite-configured mobile communications network 12 and a switched network 14. While switched network 14 is typically a public switched telephone network (PSTN) that is configured to provide further communications services, in certain arrangements switched network 14 can be any type of communications network and need not actually be a "switched network".

Within mobile communications network 12 there is shown a mobile station (MS) 16, a base station system (BSS) 18 and a switching system (SS) 20. Mobile station (MS) 16 typically includes a mobile radio terminal, such as, for example, a car phone or other portable phone or data communication device that is used by mobile subscribers.

Mobile station (MS) 16 is configured to communicate through radio frequency (RF) signals with a base transceiver station (BTS) 22 and base station controller (BSC) 24 within base station system (BSS) 18.

In turn, base station system (BSS) 18 is connected to a combined mobile switching services switching center/visitor location register (MSC/VLR) 26 within switching system (SS) 20. Typically, several base station systems (BSSs) are served by a single MSC/VLR. MSC/VLR 26 essentially controls calls to and from other telephony and data communication systems. The visitor location register (VLR) within MSC/VLR 26 usually includes a data base containing information about each mobile station (MS) currently located within the area served by the MSC/VLR 26.

As depicted, in addition to communicating with mobile station (MS) 16, base station system (BSS) 18 is also configured to communicate to at least one similarly configured MSC/VLR 30 via a satellite 28. Typically, although not necessary, satellite 28 is in a geosynchronous orbit and is capable of supporting communications over a large geographical region.

The exemplary optimization techniques described herein are typically employed to support the determination as to whether it would be more advantageous to complete a mobile station related call through either a substantially terrestrial route or a satellite-assisted route.

To understand how such optimization techniques are used, it is important to understand the basic subscriber registration functions performed within mobile communications network 12. To utilize mobile communication network 12, mobile station (MS) 16 needs to register with MSC/VLR 26. Typically, a registration process occurs when mobile station (MS) 16 is activated within or enters the coverage area of network 12, and more specifically when mobile station (MS) 16 is within the coverage area supported by a MSC/VLR.

To support the registration process, a home location register (HLR) 32 is provided within switched system (SS) 20. Home location register (HLR) 32 is connected to each MSC/VLR and contains subscriber information with respect to each subscribed mobile station (MS). As mobile station (MS) 16, for example, moves within the coverage area of mobile communications network 12, mobile station (MS) 16 registers with each successive MSC/VLR. Upon registration, each MSC/VLR requests information about mobile station (MS) 16, and, in doing so, also provides updated location information to HLR 32. In this manner, home location register (HLR) 32 and the current MSC/VLR are made aware of the location of mobile station (MS) 16, and the current MSC/VLR is provided subscriber information about mobile station (MS) 16.

When a call optimization technique is employed, there may be a need for the mobile station (MS) 16 to register with a more optimal MSC/VLR, such as, for example, registering with MSC/VLR 26 to utilize base station system (BSS) 18 and satellite 28. In this example, a call optimizer 34 is included within mobile communications network 12 to analyze a called party number that is included within the Access Request message transmitted by mobile station (MS) 16 over a Random Access Channel (RACH). Call optimizer 34 can be a separate block (as shown), or otherwise can be included within BSS 18, MSC/VLR 26, and/or HLR 32.

Call optimizer 34 determines if a more optimal MSC/VLR for the mobile originated call. Based on this determination, mobile station (MS) 16 may be required to "re-register" with a more optimal MSC/VLR.

One of the problems with this exemplary call optimization process arises when mobile station (MS) 16 is barred from making certain types or all types of outgoing calls based on the type of subscribed service. By way of example, a subscriber may be barred under his or her subscriber service contract from making international calls. When an attempt is made to place such a barred call, the call optimizer 34 may determine that re-registration of mobile station (MS) 16 is required to optimize the call. This re-registration process requires additional signaling and processing to occur within mobile communications network 12, and more specifically, for example, between and within the MSC/VLR 26 (i.e., the optimal MSC/VLR) and HLR 32.

Once this re-registration process has been completed, then MSC/VLR 26 attempts to complete the call, only to determine that the call is barred. Mobile station (MS) 16 will then need to be re-registered again with the original MSC/VLR following this failed call attempt.

By way of additional example, a subscriber that initiates a non-barred call and then hangs up, may also impact the mobile communications network 12 by initiating call optimization processes that result in unnecessary re-registering of mobile station (MS) 16. Given these scenarios, it is possible that one or more subscribers could intentionally or unintentionally cause an extensive amount of unwanted signaling and processing to occur within mobile communications network 12 by repeatedly, continually, and/or simultaneously initiating calls (but not completing) that require call optimization processes that result in the re-registration of the mobile station (MS) 16 and/or additional reallocation of resources.

Thus, there is a need for methods and arrangements that are more robust and effectively reduce the possibility that either intentional or unintentional use might lead to excessive signaling and processing within a mobile communications network that is configured to optimize calls and in doing so reallocate network resources.

SUMMARY OF THE INVENTION

The present invention provides methods and arrangements that are more robust and effectively reduce the possibility that either intentional or unintentional use might lead to excessive signaling and processing within a mobile communications network that is configured to optimize calls and in doing so reallocates network resources. For example, in accordance with certain aspects of the present invention, the methods and arrangements prevent such activity by identifying potential abuses, and providing controlling mechanisms within the mobile communications network that monitor and control re-registration and subsequent access request to the networks resources.

Thus, the above stated needs and others are met by an arrangement that includes a mobile station that is configured to selectively attempt to register with at least one "gateway" within a mobile communications network, and logic arranged to prohibit the mobile station from using the gateway for a period of time following a rejected attempt to register with the at least one base station. In certain embodiments, the logic is located within the mobile station and actively disables the mobile station from initiating selected calls during the period of time. In other embodiments the logic is located within the mobile station and disables the mobile station from initiating a location updating request during a subsequent attempt to register with the base station during the period of time. The logic, in accordance with still further embodiments, can be located within a base station subsystem where it actively disables support for selected calls from the mobile station during the period of time. This period of time, is essentially a pre-defined or dynamically programmed back-off time that can significantly prevent abuse to the mobile communications network resources.

A mobile communication system is also provided to address the above stated needs. In accordance with certain exemplary embodiments, the system includes at least one mobile station, a master controller containing subscriber information about the mobile station, and a first base station subsystem and a second base station subsystem, each of which is configured to receive the subscriber information from the master controller when the mobile station registers with the respective "gateway" and to process call requests originated from the mobile station when registered with the first base station subsystem. The system further includes a call optimizer that is at least partially within the first base station subsystem and configured to support processing of call requests from the mobile station. Based on a called party number in the call request received from the mobile station. The call optimizer is also configured to direct that the mobile station attempt to register or re-register with the second base station subsystem as a function of the called party number. For example, the second base station subsystem may be the optimal gateway for a given call. To prevent abuse to the systems resources, the system further includes a back-off timer that configured to prohibit the mobile station from using the second base station subsystem for a period of time following a rejected attempt to register with the second base station.

Additional control is provided within the system, in accordance with still further embodiments of the present invention, by configuring the master controller to count a number of rejected attempts by the mobile station over a first duration of time, and reject the mobile stations subsequent attempts to register with the second base station subsystem or gateway during a second duration of time if the number of rejected attempts is greater than a threshold value.

The above stated needs are also met by various methods for use in a mobile communications network that is configured to provide call optimization by re-registering a mobile station with a subsequent gateway. Here, in accordance with certain embodiments of the present invention, the method includes the steps of identifying when a mobile station is attempting to register with a subsequent gateway in response to a call optimization determination, and prohibiting the mobile station from using the subsequent gateway for a period of time following a failed registration attempt.

BRIEF DESCRIPTION OF THE DRAWINGS

A more complete understanding of the methods and arrangements in accordance with certain embodiments of the present invention may be had by reference to the following detailed description when taken in conjunction with the accompanying drawings wherein.

DETAILED DESCRIPTION OF THE PRESENTLY PREFERRED EXEMPLARY EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
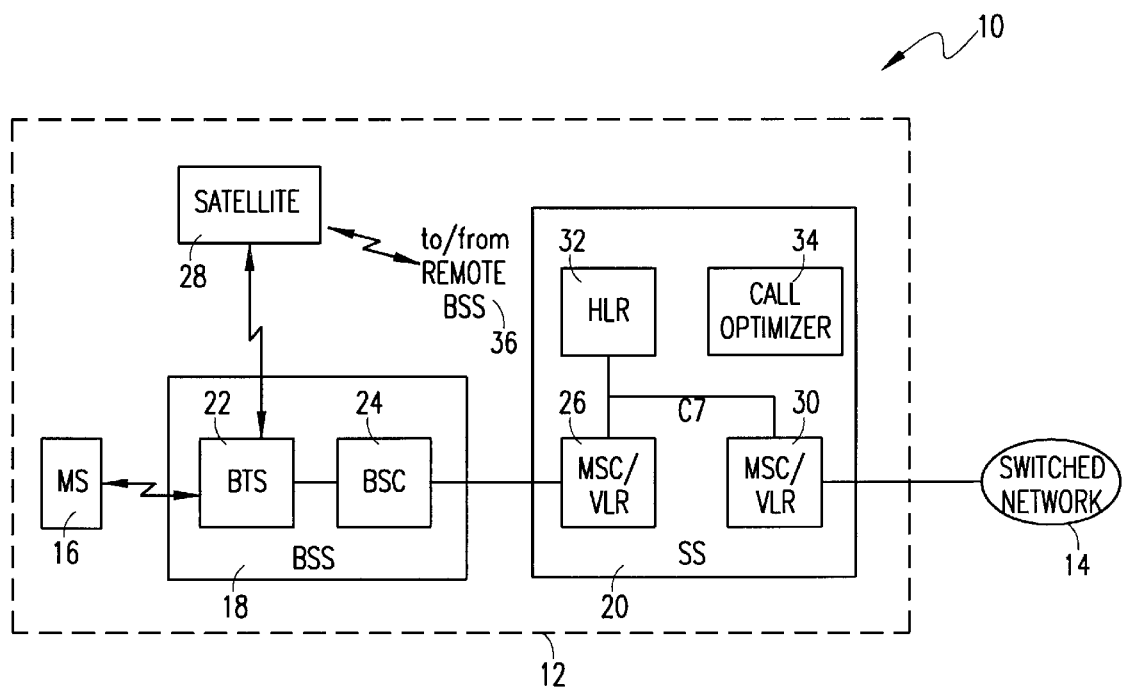
FIG. 1 is a block diagram depicting a portion of a conventional communications system that includes a mobile communications network having at least one satellite and a call optimizer.
Figure 2A:
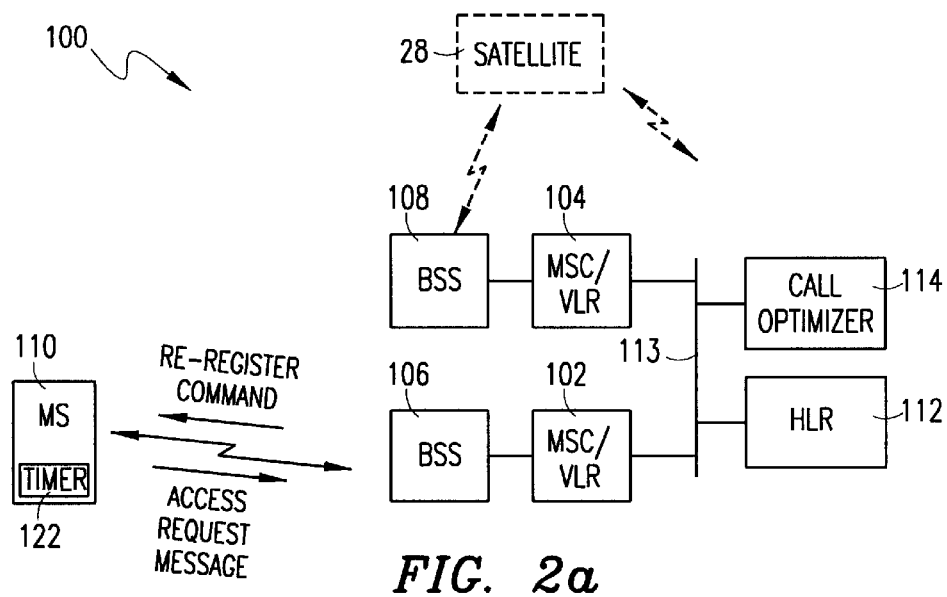
FIGS. 2A, 2B and 2C are each block diagrams sequentially depicting a mobile communications network having a mobile station that is responsible for re-registering with an more optimal gateway in response to a call optimizer, in accordance with certain embodiments of the present invention.
Figure 2B:
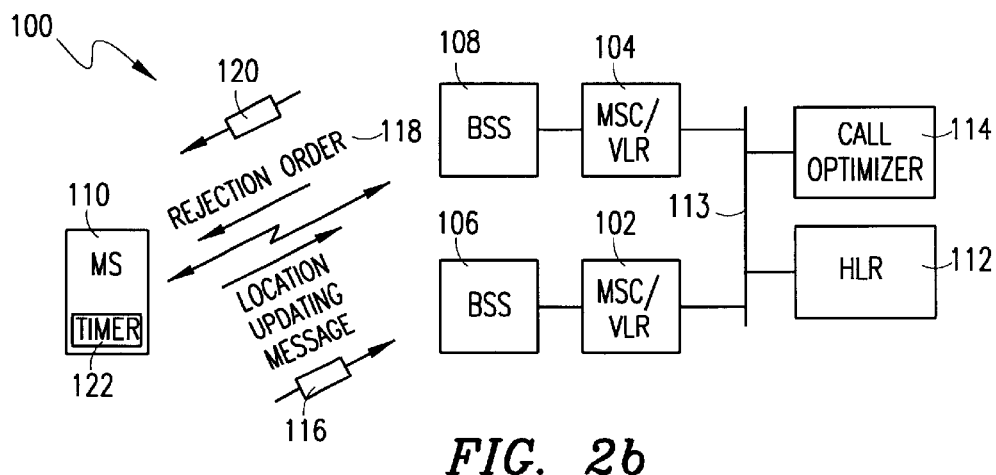
Figure 2C:
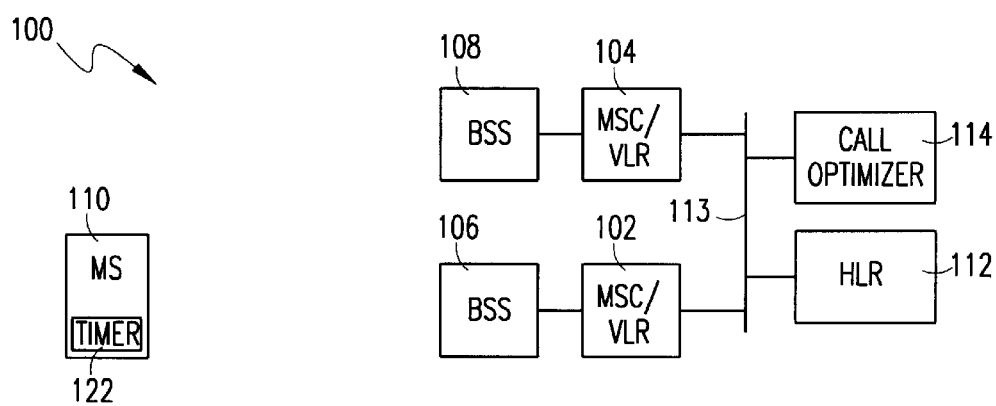

FIGS. 2A–C depict block diagrams of an exemplary mobile communications network 100, in accordance with certain embodiments of the present invention. As described above with regard to the communications system depicted in FIG. 1, only those elements necessary to fully describe the present invention to one skilled in the art are depicted in FIGS. 2A–C and later in FIGS. a–c and described in detail herein.

While the various exemplary embodiments are described herein with respect to a mobile communications network that can be adapted for use in a Global System for Mobile Communication (GSM) configured network, it is with unrestricted intent that other communication networks, including, for example, analog, digital, voice, data, and/or substantially satellite-based communication systems can employ the teaching of the present invention to increase the control of the communications processes and related signaling and/or processing resources used therein. Unless stated otherwise, the referenced items described in the following detailed description share common functionality with the similarly named items as depicted in FIG. 1 and described above.

As shown in FIGS. 2A–C, mobile communications network 100 includes a plurality of MSC/VLRs, such as MSC/VLR 102 and MSC/VLR 104. There is at least one BSS 106 connected to MSC/VLR 102. Similarly, there is at least one BSS 108 connected to MSC/VLR 104. A mobile station (MS) 110 is depicted being registered with MSC/VLR 102 through BSS 106. As described below, mobile station (MS) 110 is depicted at a time, t=1, when a call is mobile originated call is being initiated. Further shown in FIGS. 2A–C, is a home location register (HLR) 112. HLR 112 is the home location register to which mobile station (MS) 110 is subscribed to.

For discussion purposes and to further the example described in the Background section above with respect to FIG. 1, it will be assumed that the subscriber services for mobile station (MS) 110 do not include the capability to make outgoing calls.

The information regarding this type of "barred" call, and other subscriber information is stored in HLR 112 and provided to, or otherwise accessed by, either MSC/VLRs 102 and/or 104, during the registration of mobile station (MS) 110 therewith.

Thus, for example, as depicted in FIG. 2A, mobile station (MS) 110 registered with MSC/VLR 102 at an earlier time, t=0. During this earlier registration, MSC/VLR 102 stored necessary subscriber information about MS 110 within the visitor location register (VLR).

To support this type of registration, subscriber information is normally exchanged between MSC/VLR 102 and HLR 112 using a separate network, such as, for example, a signaling system number 7 (SS7 CC7, C7, S7, OR N7) network. As described herein, one of the advantages of the present invention is that additional controlling mechanisms are put into place to prevent a malicious or unknowing subscriber from detrimentally impacting the traffic on this supporting network.

Also depicted in FIG. 2A is a call optimizer 114 that is configured to operate within one or more processing units of the mobile communications network 100. By way of example, call optimizer 114 can be embodied completely or partially within one or more of the MS 110, MSC/VLRs (102/104), BSSs (106/108), and/or HLR 112. Call optimizer 114 functions to examine information contained within one or more messages or signals regarding a desired mobile originated call and based at least partially on this information, determines a more optimized route for completing and/or maintaining the call. For example, call optimizer 114 in accordance with certain embodiments of the present invention is substantially embodied within MSC/VLR 102 and HLR 112 and is configured to analyze a called party number that is included within the setup message transmitted by mobile station (MS) 110 via BSS 106.

Continuing with the exemplary time line, at time t=1, a subscriber inputs a telephone number and presses the send key (or equivalent) on MS 110. It is assumed, for this example, that the telephone number will result in an international call (or some other barred call).

The called party number is included in a setup message sent from MS 110 to MSC/VLR 102. Call optimizer 114 analyzes the called party number to determine a most optimal (or otherwise most preferred) routing of the call, at least within a portion of the mobile communications network.

It is assumed, in this example, that the call optimizer determines that based on the called party number it would be more optimal to use MSC/VLR 104 and associated BSS 108, which is configured to communicate via a satellite (e.g., see satellite 28 in FIG. 1) for this call. Those skilled in the art will recognize that the decision to utilize satellite network resources may prove optimal in certain situations because expensive terrestrial network communication resources can be bypassed. It should also be understood in the art that the satellite 28 communicates through terrestrial gateway components, discussed in more detail hereinafter.

At time t=1, therefore, the call setup information has been sent from MS 110 to BSS 106 and passed on to MSC/VLR 102 and HLR 112. Based on this information and other information call optimizer 114 initiates a re-registration process that eventually results in MS 110 being registered with the MSC/VLR determined to be most optimal, in this example, MSC/VLR 104 and associated BSS 108.

In FIG. 2B, at time t=2, MS 110 is directed to re-register with MSC/VLR 104, in accordance with certain embodiments of the present invention. The re-registration is attempted in a conventional manner, for example, as though MS 110 has just entered the coverage area of MSC/VLR 104 and BSS 108. This can be accomplished by having MS 110 send a Location Updating request to BSS 108 and MSC/VLR 104. In accordance with certain embodiments of the present invention, however, additional information, e.g. location updating information 116, is included in the Location Updating request to indicate that a re-registration is being attempted in response to call optimizer 114. This additional information can, for example, be a flag or logic value of one or more bits included in the Location Updating message, or like message. It should be understood that the HLR 112 keeps track of the number of registrations and the limit allowed registrations due to call optimization for a given time interval.

If all outgoing calls are not barred, as determined by the HLR 112, for example, then the MS 110 is allowed to register with the MSC/VLR 104 and the call set-up is completed. If, however, the registration limit has been exceeded, then the registration is denied.

If, however, as in the present example, all outgoing calls are barred, as determined by the HLR 112, then at time, t=3, as depicted in FIG. 2C, the Location Updating request is denied or otherwise rejected and a rejection order 118 to this effect is sent back to the MSC/VLR 104.

Within the MSC/VLR 104, given that this is a re-registration attempt in response to the call optimizer, the rejection order is mapped to a new cause code 120 that is then returned to the MS 110 via BSS 108. Upon receipt at the MS 110, the new cause code 120 initiates a back-off timer 122 within the MS 110.

Back-off timer 122 functions to prevent re-registration attempts by the MS 110 for a specified period of time. The time specified can be preprogrammed in MS 110, sent from MSC/VLR 104 via BSS 108, or broadcast over a broadcast control channel (BCCH) or the like. Once the back-off timer 122 has been activated, the subscriber will be unable to register. In certain preferred embodiments, however, emergency calls will still be allowed while the back-off timer 122 is activated. After back-off timer 122 has timed out, MS 110 will be allowed to register again and the subscriber can again attempt to make outgoing calls.

Figure 3A:
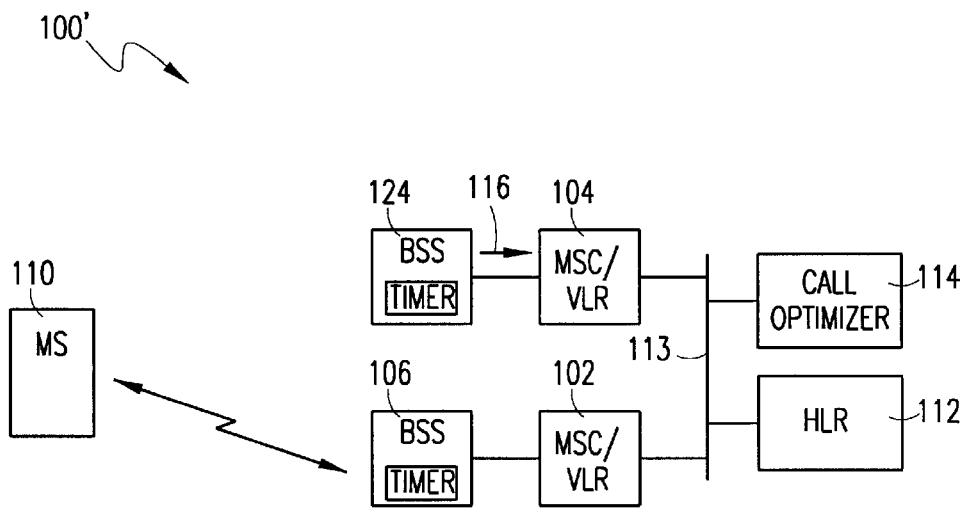
FIGS. 3A, 3B and 3C are each block diagrams sequentially depicting a mobile communications network having a mobile station that is not responsible for re-registering with an more optimal gateway in response to a call optimizer, in accordance with certain embodiments of the present invention.
Figure 3B:
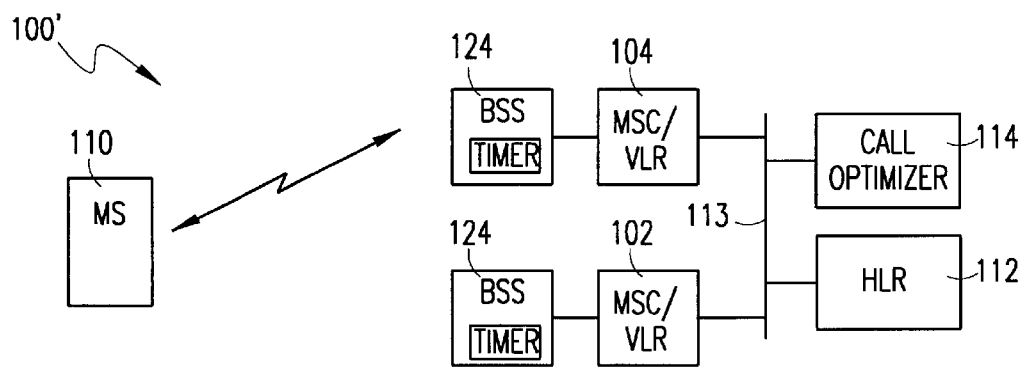
Figure 3C:
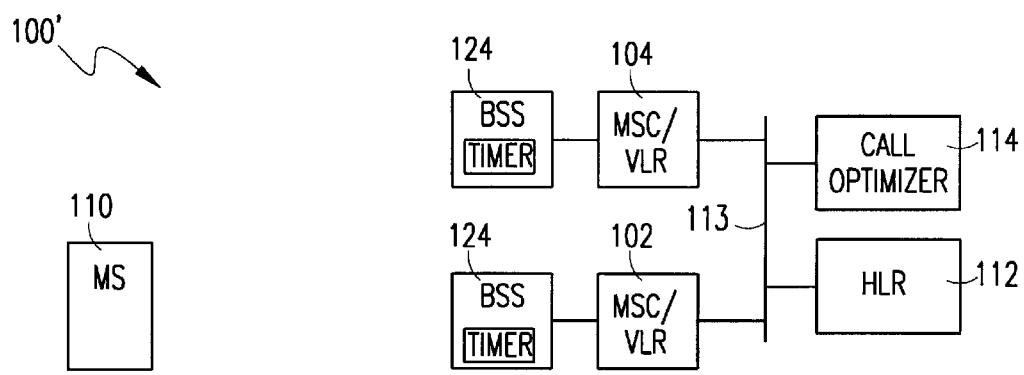

FIGS. 3A–C depict block diagrams similar to those in FIGS. 2A–C, respectively. The mobile communication network 100 in FIGS. 2A–C, in accordance with still other embodiments of the present invention, however, does not utilize the MS 110 to attempt a re-registration in response to the call optimizer 114. Instead, the re-registration is initiated by the BSS 108.

With this in mind, in FIG. 3A, a call is attempted by the MS 110 just as in FIG. 2A. In FIG. 3B, however, the BSS 108, in response to the call optimizer 114 forwards the additional information 116 to the MSC/VLR 104, indicating that the Location Updating request is in response to the call optimizer 114. This additional information 116 is then passed on to the HLR 112, as described above and also depicted in FIG. 2B.

If, however, the call attempted is determined to be barred by the HLR 112, then at time, t=3, as depicted in FIG. 3C, the Location Updating request is denied or otherwise rejected and the appropriate rejection order 118 to this effect is sent back to the MSC/VLR 104.

Within the MSC/VLR 104, given that this is a re-registration attempt in response to the call optimizer, the rejection order is mapped to new cause code 120, which is then provided to the BSS 108. Upon receipt at the BSS 108, the new cause code 120 initiates a back-off timer 124 within the BSS 108, and the rejection order or a portion thereof is then provided to the MS 110.

Back-off timer 124 functions to prevent call attempts by the MS 110 for a specified period of time. The time specified can be preprogrammed in the respective BSSes 108, or sent from the HLR 112 and/or the MSC/VLR 104 to the BSS 108. Once back-off timer 124 has been activated, the subscriber will then be unable to make calls through the BSS 108 for the specified time period. In certain preferred embodiments, however, emergency calls will still be allowed while the back-off timer 124 is activated. After back-off timer 124 has timed out, the MS 110 will then be allowed to attempt to make outgoing calls. In accordance with still further embodiments of the present invention, HLR 112 (for example, in either of the FIGS. 2A–C or FIGS. 3A–C arrangements) can also be configured to count the number of times that a subscriber had attempted to re-register within a particular time period. If the number of re-registration attempts exceeded a predefined threshold value, then a Location Updating request would automatically be rejected.

The present invention, as demonstrated in the above exemplary arrangements and methods, therefore, reduces the potential for intentional or unintentional abuse of the signaling and/or processing resources within mobile communications network 100. By actively identifying and monitoring the number of re-registration attempts that are related to call optimization, the methods and arrangements in accordance with the present invention provide a controlling mechanism that can be employed to reduce the subscribers ability to place calls, re-register, or otherwise disturb the operation of the network.

Figure 4:
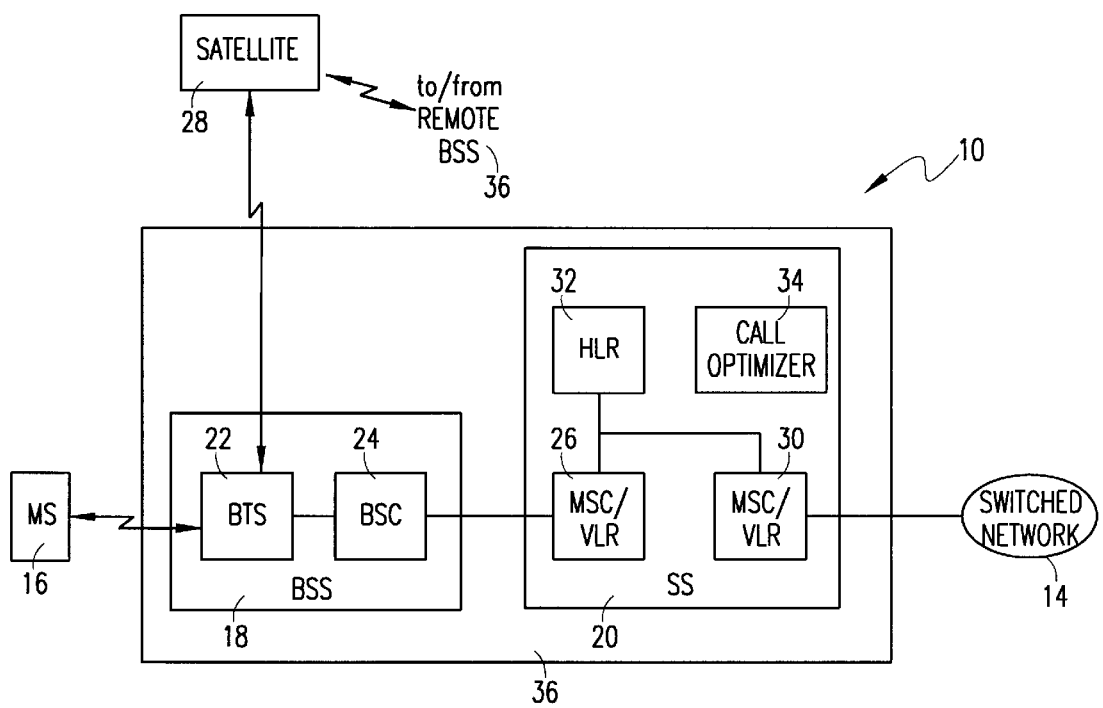
FIG. 4 is a block diagram depicting a portion of a communication system that includes a mobile communication network having at least one satellite and a gateway to communicate therewith.

It should be understood from the above that the re-registration process is not limited to the BTS 22 within the BSS components, but is intended to operate across a number of such gateways. In particular, the registration procedure is intended to register the subscriber in the VLR 26 within the "gateway" and not the BTS 22, as such, which is a collection of transceivers and modems. Accordingly, Applicants draw a distinction between the BSS 18, which is a network node handling some of the re-registration signaling and logic, and a more generic gateway 36, further illustrated in FIG. 4, which represents the place to which the subscriber is trying to register, e.g., the MSC/VLR 26.

As will be recognized by those skilled in the art, the innovative concepts described in the present application can be modified and varied over a wide range of applications. Accordingly, the scope of patented subject matter should not be limited to any of the specific exemplary teachings discussed.

What is claimed is:

1. An arrangement for use in a mobile communications network, the arrangement comprising:
  a master controller comprising subscriber information about a mobile station;
  the mobile station being configured to selectively attempt to register with at least one of a plurality of gateways within a mobile communications network; and
  a back off timer arranged to prohibit the mobile station from using the at least one gateway for a period of time following a rejected attempt to register with the at least one base station, the rejected attempt being determined by the master controller and identified to the mobile station by the at least one gateway.

2. The arrangement as recited in claim 1, wherein the back off timer is located within the mobile station and is further configured to disable the mobile station from initiating selected calls during the period of time.

3. The arrangement as recited in claim 1, wherein the back off timer is located within the mobile station and is further configured to disable the mobile station from initiating a location updating request during a subsequent attempt to register with the at least one gateway during the period of time.

4. The arrangement as recited in claim 1, wherein the back off timer is located within the mobile station and is further configured to disable the mobile station from initiating a location updating request during a subsequent attempt to register with the at least one gateway during the period of time, unless an emergency call is being initiated.

5. The arrangement as recited in claim 1, wherein the back off timer is located within the at least one base station and is configured to disable support for selected calls from the mobile station during the period of time.

6. The arrangement as recited in claim 1, wherein the back off timer is configured to measure a pre-defined period of time.

7. The arrangement as recited in claim 1, wherein the back off timer is configured to measure a programmable period of time.

8. A mobile communication system comprising:
    at least one mobile station;
    a master controller comprising subscriber information about the mobile station;
    a first base station subsystem configured to receive the subscriber information from the master controller when the mobile station registers with the first base station subsystem and to process call requests originated from the mobile station when registered with the first base station subsystem;
    a second base station subsystem configured to receive the subscriber information from the master controller when the mobile station registers with the second base station subsystem and to process call requests originated from the mobile station when registered with the second base station subsystem;
    a call optimizer at least partially within the first base station subsystem and configured to support processing of call requests from the mobile station based on a called party number in the call request received from the mobile station, the call optimizer being further configured to direct that the mobile station attempt to register with the second base station subsystem as a function of the called party number; and
    a back-off timer configured to prohibit the mobile station from using the second base station subsystem for a period of time following a rejected attempt to register with the second base station subsystem, the rejected attempt being determined by the master controller and identified to the mobile station by the second base station subsystem.

9. The system as recited in claim 8, wherein the back-off timer is within the mobile station and further configured to disable the mobile station from initiating selected calls during the period of time.

10. The system as recited in claim 8, wherein the back-off timer is within the mobile station, and further configured to disable the mobile station from initiating a location updating request during a subsequent attempt to register with the second base station subsystem during the period of time.

11. The system as recited in claim 8, wherein the back-off timer is within the mobile station, and further configured to disable the mobile station from initiating a location updating request during a subsequent attempt to register with the second base station subsystem during the period of time, unless an emergency call is being initiated.

12. The system as recited in claim 8, wherein the back-off timer is within the second base station subsystem and further configured to disable support for selected calls from the mobile station during the period of time.

13. The system as recited in claim 8, wherein the back-off timer is configured to measure a pre-defined period of time.

14. The system as recited in claim 8, wherein the back-off timer is configured to measure a programmable period of time.

15. The system as recited in claim 8, wherein the master controller is further configured to count a number of rejected attempts by the mobile station over a first duration of time, and reject the mobile stations subsequent attempts to register with the second base station subsystem during a second duration of time if the number of rejected attempts is greater than a threshold value.

16. A method for use in a mobile communications network configured to provide call optimization by re-registering a mobile station with a subsequent gateway, the method comprising:
    determining a failed registration attempt;
    identifying to the mobile station by a subsequent gateway of the determined failed registration attempt;
    identifying when a mobile station is attempting to register with the subsequent gateway in response to a call optimization determination; and
    timing, with a back-off timer, a period of time following the determined failed registration during which the mobile station is prohibited from using the subsequent gateway.

17. The method as recited in claim 16, wherein the step of timing includes the step of prohibiting the mobile station from using the subsequent gateway for the period of time following the failed registration attempt further comprises, within the mobile station, disabling the mobile station from initiating selected calls during the period of time.

18. The method as recited in claim 16, wherein the step of timing further includes the step of prohibiting the mobile station from using the subsequent gateway for the period of time following the failed registration attempt further comprises, within the mobile station, disabling the mobile station from initiating a location updating request in a renewed attempt to register with the subsequent gateway during the period of time, unless an emergency call is being initiated.

19. The method as recited in claim 16, wherein the step of timing further includes the step of prohibiting the mobile station from using the subsequent gateway for the period of time following the failed registration attempt further comprises, within the subsequent gateway disabling support for selected calls from the mobile station during the period of time.

20. The method as recited in claim 16, wherein the step of identifying when the mobile station is attempting to register with the gateway in response to the call optimization determination further comprises:
    receiving a called party number from the mobile station through an initial base station;
    identifying the subsequent gateway, based on the called party number, wherein the subsequent gateway is configured to process calls through a satellite;
    causing the mobile station to attempt to register with the subsequent gateway.

21. The method as recited in claim 16, wherein the step of timing further includes the step of prohibiting the mobile station from using the subsequent gateway for the period of time following the failed registration attempt further comprises, activating a timing mechanism in the mobile station, wherein the timing mechanism is configured to define the period of time.

22. The method as recited in claim 21, wherein the step of activating the timing mechanism in the mobile station further comprises using the timing mechanism to measure a pre-defined period of time.

23. The method as recited in claim 21, wherein the step of activating the timing mechanism in the mobile station further comprises setting the timing mechanism to measure a programmable-defined period of time.

24. The method as recited in claim 16, wherein the step of timing further includes the step of prohibiting the mobile station from using the subsequent gateway for the period of time following the failed registration attempt further comprises:

counting a number of failed registration attempts by the mobile station over a first duration of time; and disallowing the mobile station from registering with the subsequent gateway during a second duration of time if the number of failed registration attempts exceeds a threshold value.

* * * * *

UNITED STATES PATENT AND TRADEMARK OFFICE
CERTIFICATE OF CORRECTION

PATENT NO. : 6,356,755 B1
DATED : March 12, 2002
INVENTOR(S) : Eric Valentine et al.

It is certified that error appears in the above-identified patent and that said Letters Patent is hereby corrected as shown below:

<u>Column 8,</u>
Line 63, replace "base station" with -- gateway --

<u>Column 9,</u>
Line 16, replace "base station" with -- gateway --

Signed and Sealed this

Twenty-seventh Day of July, 2004

JON W. DUDAS
*Acting Director of the United States Patent and Trademark Office*